US012755418B2

(12) United States Patent
Kawasaki et al.

(10) Patent No.: US 12,755,418 B2
(45) Date of Patent: Oct. 6, 2026

(54) INFORMATION PROCESSING APPARATUS, INFORMATION PROCESSING METHOD, AND COMPUTER PROGRAM

(71) Applicant: KABUSHIKI KAISHA TOSHIBA, Tokyo (JP)

(72) Inventors: Atsushi Kawasaki, Yokohama (JP); Tomoki Watanabe, Inagi (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 289 days.

(21) Appl. No.: 18/589,174

(22) Filed: Feb. 27, 2024

(65) Prior Publication Data

US 2024/0412400 A1 Dec. 12, 2024

(30) Foreign Application Priority Data

Jun. 12, 2023 (JP) ................................ 2023-096168

(51) Int. Cl.
*G06T 7/70* (2017.01)
*G06T 7/246* (2017.01)
(Continued)

(52) U.S. Cl.
CPC ................ *G06T 7/70* (2017.01); *G06T 7/246* (2017.01); *G06V 10/44* (2022.01); *G06V 10/761* (2022.01); *G06T 2207/30244* (2013.01)

(58) Field of Classification Search
CPC . G06T 7/70; G06T 7/246; G06T 2207/30244; G06V 10/761; G06V 10/44
See application file for complete search history.

(56) References Cited

U.S. PATENT DOCUMENTS 10,467,526 B1 * 11/2019 Appalaraju ......... G06F 16/9538
2018/0197307 A1 7/2018 Tomioka et al.
2019/0244050 A1 * 8/2019 Lin ........................ G06V 10/17

FOREIGN PATENT DOCUMENTS

CN 115546141 A * 12/2022 ............. G06V 10/44
JP 2012-68772 A 4/2012
(Continued)

OTHER PUBLICATIONS

2026.*
(Continued)

*Primary Examiner* — Pinalben Patel
(74) *Attorney, Agent, or Firm* — Oblon, McClelland, Maier & Neustadt, L.L.P.

(57) ABSTRACT

An information processing apparatus according to an embodiment includes one or more hardware processors configured to function as a correspondence relationship acquisition unit, a selection unit, and a calculation unit. The correspondence relationship acquisition unit is configured to calculate a plurality of image features from a plurality of images captured by a camera and acquire a correspondence relationship between the image features. The selection unit is configured to select a plurality of correspondence relationships, based on effectiveness of the correspondence relationship and an influence on at least one of the images when the correspondence relationship with the effectiveness lower than an effectiveness threshold is eliminated. The calculation unit is configured to calculate at least one of a position and direction of the camera and three-dimensional information on the image features from the correspondence relationship selected from among the correspondence relationships.

13 Claims, 8 Drawing Sheets

(51) Int. Cl.
*G06V 10/44* (2022.01)
*G06V 10/74* (2022.01)

(56) References Cited

FOREIGN PATENT DOCUMENTS

| | | | | |
|---|---|---|---|---|
| JP | 2016-38790 | A | | 3/2016 |
| JP | 5953142 | B2 | * | 7/2016 |
| JP | 2018-113021 | A | | 7/2018 |
| JP | 2020-52687 | A | | 4/2020 |
| JP | 2023-501574 | A | | 1/2023 |

OTHER PUBLICATIONS

Japanese Office Action issued on Jan. 27, 2026 in Japanese Patent Application No. 2023-096168 (with unedited computer-generated English translation), 8 pages.

* cited by examiner

INFORMATION PROCESSING APPARATUS, INFORMATION PROCESSING METHOD, AND COMPUTER PROGRAM

CROSS-REFERENCE TO RELATED APPLICATIONS

This application is based upon and claims the benefit of priority from Japanese Patent Application No. 2023-096168, filed on Jun. 12, 2023; the entire contents of which are incorporated herein by reference.

FIELD

Embodiments described herein relate generally to an information processing apparatus, an information processing method, and a computer program.

BACKGROUND

Simultaneous Localization and Mapping (SLAM) and Structure from Motion (SfM) have attracted attention as technologies that simultaneously perform self-position estimation and three-dimensional measurement of a surrounding environment by using a camera. Cameras can be used indoors and are relatively inexpensive and easy to use. As such, the application of camera-employed technologies are expected. Applications such as measurement of a capturing position and a target position in, for example, infrastructure maintenance and inspection/patrolling, estimation of the movement of a driver's vehicle in an accident video, and digital archiving of cultural properties for the purpose of protecting our cultural heritage are exemplified.

However, by the conventional technologies, it was difficult to reduce the computational cost of calculating at least one of the position and direction of a camera and three-dimensional information on an image feature while maintaining accuracy.

DETAILED DESCRIPTION

Figure 1:
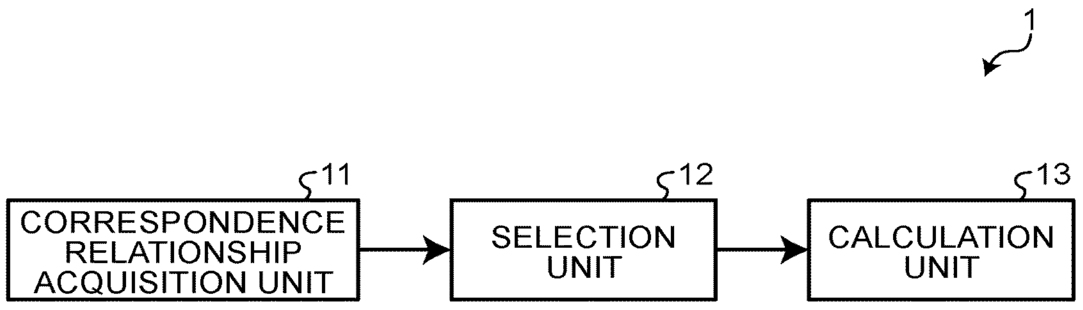
FIG. 1 is a diagram illustrating a functional configuration example of an information processing apparatus according to an embodiment.

An information processing apparatus according to an embodiment includes one or more hardware processors configured to function as a correspondence relationship acquisition unit, a selection unit, and a calculation unit. The correspondence relationship acquisition unit is configured to calculate a plurality of image features from a plurality of images captured by a camera and acquire a correspondence relationship between the image features. The selection unit is configured to select a plurality of correspondence relationships, based on effectiveness of the correspondence relationship and an influence on at least one of the images when the correspondence relationship with the effectiveness lower than an effectiveness threshold is eliminated. The calculation unit is configured to calculate at least one of a position and direction of the camera and three-dimensional information on the image features from the correspondence relationship selected from among the correspondence relationships. With reference to the accompanying drawings, embodiments of an information processing apparatus, an information processing method, and a computer program will be described in detail below.

First, a difference between SLAM and SfM is described. SLAM is generally used in applications that require real-time processing, such as automatic operation, and uses a continuous image sequence as an input to sequentially perform position estimation, for example. Since processing speed is emphasized more than processing accuracy, a target range for performing the optimization of the position and direction of a camera and the surrounding environment of the camera is narrowed down, for example.

In contrast, SfM is based on off-line processing, and the input is not limited to a continuous image sequence, but all image groups are used as the input, whereby optimization is performed with emphasis on accuracy.

SfM, which emphasizes accuracy, is suitable for the measurement of a capturing position and an object position in maintenance and inspection patrolling, the estimation of the movement of a driver's vehicle in an accident video, and the like, because SfM does not require real-time processing. On the other hand, when the speed of processing is increased even in SfM, which uses all image groups, there is effectiveness, for example, server usage fee is reduced and waiting times for a user using the application is reduced, and thus there is a desire for technologies for speeding up SfM.

A common processing flow in SfM includes detecting feature points from an image group, creating correspondence points by associating the feature points, estimating an initial value of the position and direction of a camera, estimating initial values of three-dimensional points of the correspondence points, and optimization of the estimated position and direction of the camera and the estimated three-dimensional points. The optimization is often performed by Bundle Adjustment, which minimizes a reprojection error when the three-dimensional points are reprojected onto an image at the position and direction of the camera.

In general, processing time for the optimization occupies the largest part of the processing flow, and when the number of correspondence points is larger, the number of estimated variables is larger. Therefore, there is a problem in that, although speed can be increased by reducing the number of correspondence points, accuracy decreases when the number of correspondence points is randomly reduced. For example, the number of correspondence points can be reduced by reducing the number of feature points detected or by increasing the lower limit of the number of corresponding images at correspondence points, but optimal parameters for maintaining accuracy are different on different scenes and are therefore difficult to uniquely determine.

Hereinafter, an embodiment will be described in which a correspondence relationship between image features (for example, feature points) contained in two or more camera images is selected, and at least one of the position and direction of a camera and three-dimensional information on the image features is calculated, based on the selected correspondence relationship.

Functional Configuration Example

FIG. 1 is a diagram illustrating a functional configuration example of an information processing apparatus 1 of the embodiment. The information processing apparatus 1 of the embodiment includes a correspondence relationship acquisition unit 11, a selection unit 12, and a calculation unit 13.

The correspondence relationship acquisition unit 11 acquires a correspondence relationship between image features in two or more camera images. Specifically, the correspondence relationship acquisition unit 11 calculates image features indicating a characteristic area in a camera image, and, based on image features in two or more camera images, the correspondence relationship acquisition unit 11 associates the image features indicating the same portion with each other. Here, the image features may be in the form of a point (a feature point) or a line. The image features are calculated, for example, from the luminance gradient of the images.

For the calculation of the image features, feature point detection algorithms such as Scaled Invariance Feature Transform (SIFT), Speed-Upped Robust Feature (SURF), and Accelerated KAZE (AKAZE) may be used or deep neural networks may be used.

The image features may be associated with each other, based on the degree of similarity (the degree of matching) between feature amounts obtained by quantifying the image features with a feature descriptor, or may be calculated from the degree of similarity between pixels in the surrounding area of the image features. For the calculation of the feature descriptor, feature point detection algorithms such as SIFT, SURF and AKAZE may be used, or deep neural networks may be used.

The degree of similarity between the feature amounts is calculated, for example, from the L1 norm, L2 norm, Hamming distance, or cosine similarity between N-dimensional feature amounts. The degree of similarity between pixels in the surrounding area is calculated, for example, from Sum of Squared Difference (SSD), Sum of Absolute Difference (SAD), or normalized cross-correlation.

When the degree of similarity described above is equal to or higher than a predetermined threshold, the correspondence relationship acquisition unit 11 associates image features indicating the same portion in a plurality of images with each other and stores the correspondence relationships between the image features in a memory of the information processing apparatus 1. The image features are associated not only between two images, but also between more than two images. In other words, the correspondence relationship acquisition unit 11 acquires the correspondence relationships in which image features are associated in two or more images.

From correspondence relationships obtained by the correspondence relationship acquisition unit 11, the selection unit 12 selects a correspondence relationship effective for calculating at least one of the position and direction of a camera and three-dimensional information on the image features. By eliminating only a correspondence relationship unnecessary for maintaining the accuracy of the position and direction and the three-dimensional information, the selection unit 12 can reduce the number of estimation parameters for optimization such as Bundle Adjustment in SfM, whereby processing time can be reduced.

Here, in the case where image features are feature points, estimation parameters are the position and direction of a camera and three-dimensional points each for a corresponding one of correspondence points, and reducing the correspondence relationships results in a reduction in the number of the three-dimensional points and thereby directly reduces the number of the estimation parameters. On the other hand, correspondence relationships necessary for maintaining accuracy remain, so that the accuracy of the position and direction and the three-dimensional information can be maintained.

Hereinafter, a method for selecting an effective correspondence relationship will be described.

In general, the effective correspondence relationship contributing to the accuracy of position and direction estimation in SfM includes, for example, the following five indexes.

- A larger amount of movement of images features in images in the correspondence relationship.
- A larger number of images containing image features corresponding to image features of other images.
- A higher degree of similarity (matching) of correspondence in the correspondence relationship.
- A wider distribution of image features in an image that correspond to image features in other images.
- Higher reliability of the correspondence relationship.

Examples of the above-mentioned five indexes for evaluating the effectiveness of a correspondence relationship will be described one by one.

First, the amount of movement of image features in images in the correspondence relationship refers to how much the image features indicating the same portion have moved between different images (the amount of movement between positions indicated by two image features corresponding to each other). The case in which the image features are feature points is generally referred to as a flow.

Figure 2A:
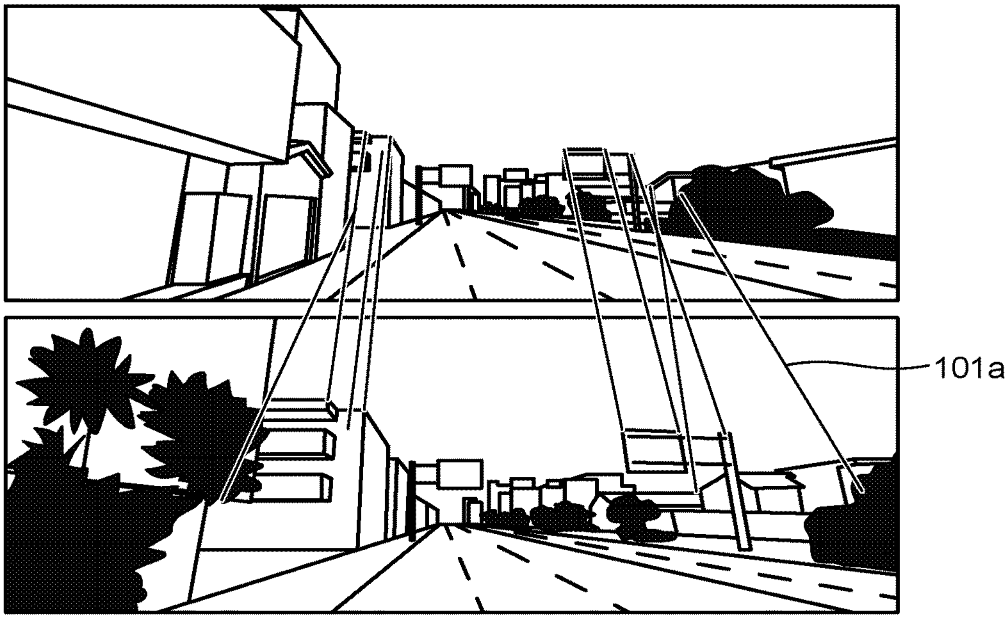
FIG. 2A is a diagram illustrating a first example of the amount of movement of image features in the embodiment.
Figure 2B:
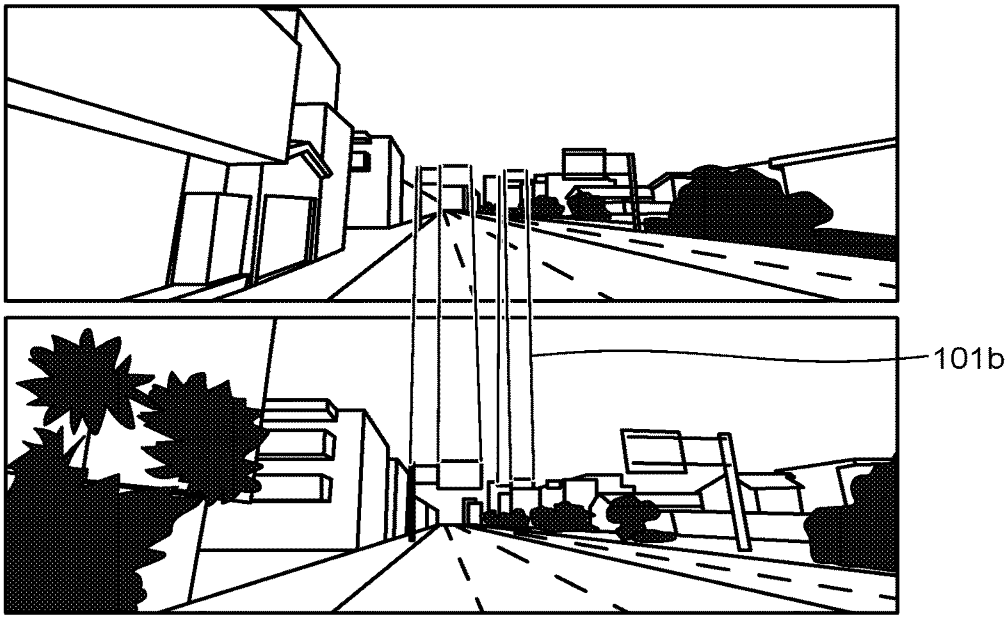
FIG. 2B is a diagram illustrating a second example of the amount of movement of image features in the embodiment.

FIG. 2A is a diagram illustrating a first example of the amount of movement of image features in the embodiment. FIG. 2B is a diagram illustrating a second example of the amount of movement of image features in the embodiment. The examples in FIG. 2A and FIG. 2B indicate cases in which the image features are feature points.

For example, a correspondence relationship 101*a* in FIG. 2A is obtained from corresponding feature points (feature points indicating the same portion) in two different images. Similarly, a correspondence relationship 101*b* in FIG. 2B is obtained from feature points corresponding to each other (feature points indicating the same portion) in the two different images.

When the feature points corresponding to each other in the two different images are more distant from each other, a flow indicating the amount of movement is larger. In the examples in FIG. 2A and FIG. 2B, for example, the amount of movement of the image features in the images in the correspondence relationship 101_a_ is larger than the amount of movement of the image features in the images in the correspondence relationship 101_b_.

Note that FIG. 2A and FIG. 2B are examples of a flow between two images, but, in the case of associating feature points in more than two images, for example, a method may be used for calculating a flow by using a difference between the position of a feature in an image observed the earliest during associating the feature points and the position of a feature in an image observed the latest during associating the feature points.

Alternatively, for example, in the case of associating feature points in two or more images, a method may be used for calculating a difference between the maximum value and the minimum value of the x-coordinate of feature points in images and a difference between the maximum value and the minimum value of the y-coordinate of the feature points in the images and then calculating a flow between feature points having the larger differences.

In SfM, the position and direction of a camera and three-dimensional information on image features (the three-dimensional information on an environment surrounding the camera) are estimated by changes in the view of an object. Therefore, the magnitude of the amount of movement of image features in images (for example, a flow of feature points) is an important index for estimating the position and direction of the camera and three-dimensional information on the image features.

For example, the selection unit 12 selects a plurality of correspondence relationships so as not to eliminate a correspondence relationship having a larger amount of movement between positions indicated by two image features corresponding to each other.

Next, the number of images containing image features corresponding to image features of other images refers to the number of images associated with the image features indicating the same portion, the images being obtained by observing the same portion as image features in the different images.

Figure 3:
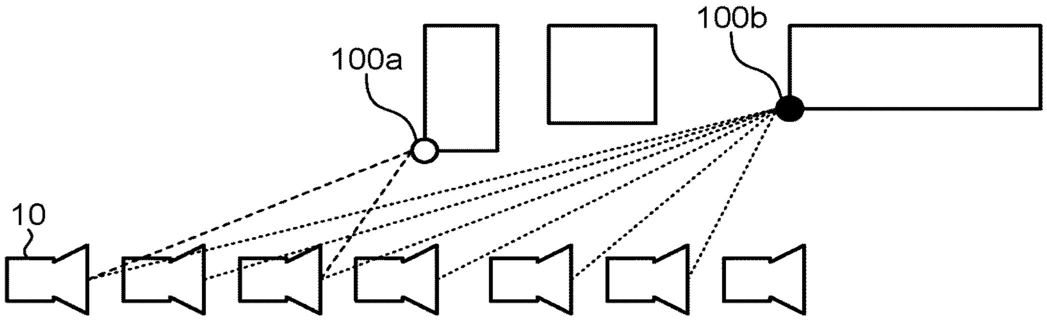
FIG. 3 is a diagram for explaining the number of images containing image features corresponding to each other in the embodiment.

FIG. 3 is a diagram for explaining the number of images containing image features 100_a_ and 100_b_ corresponding to each other in the embodiment. The example in FIG. 3 indicates a case in which the image features 100_a_ and 100_b_ are feature points. Furthermore, the example in FIG. 3 indicates a case in which images are captured by a camera 10 installed in a mobile object such as a car during the movement of the mobile object. The image feature 100_a_ is included in two images captured by the camera 10. In contrast, the image feature 100_b_ is included in six images captured by the camera 10.

In the example in FIG. 3, the number of images containing the image feature 100_b_ is larger than the number of images containing the image feature 100_a_, and hence the correspondence relationship of the image feature 100_b_ is more effective than the correspondence relationship of the image feature 100_a_.

In SfM, when the number of portions observed in a plurality of images is larger, accumulated errors such as scale drift in the position and direction of the camera 10 can be reduced, and hence the number of images associated with the image features indicating the same portion is an important index.

For example, the selection unit 12 selects a plurality of correspondence relationships so as not to eliminate a correspondence relationship having a larger number of images containing image features corresponding to each other.

Next, the degree of similarity (the degree of matching) in correspondence refers to the degree of similarity in correspondence that is calculated by the correspondence relationship acquisition unit 11. The degree of similarity of correspondence is an important index because a higher degree of similarity between the image features associated results in less erroneous correspondence and more accurate estimation of the position and direction of the camera 10.

For example, the selection unit 12 selects a plurality of correspondence relationships so as not to eliminate a correspondence relationship having a higher degree of similarity between image features corresponding to each other.

Next, the distribution of image features refers to the distribution of image features in one image.

Figure 4A:
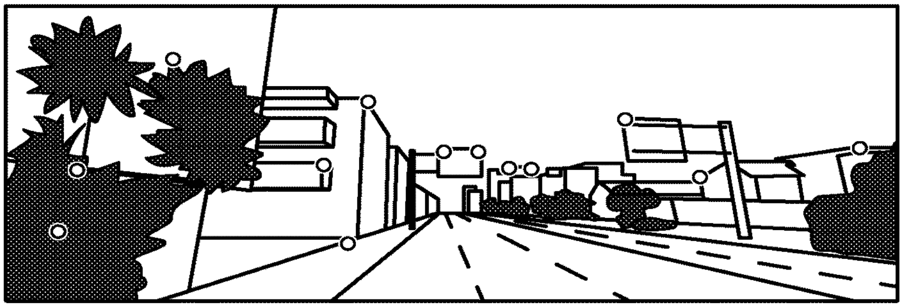
FIG. 4A is a diagram illustrating a first example of distribution of image features in the embodiment.
Figure 4B:
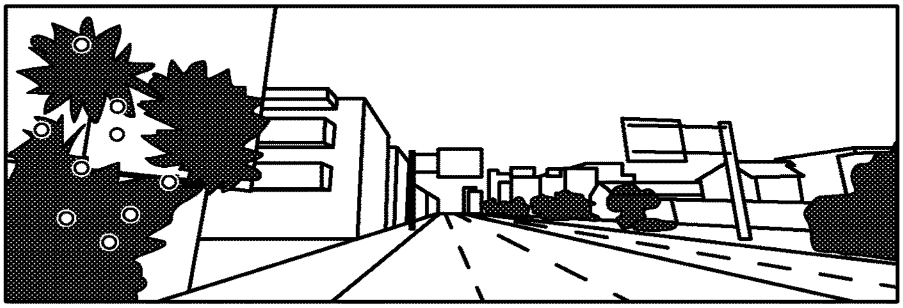
FIG. 4B is a diagram illustrating a second example of distribution of image features in the embodiment.

FIG. 4A is a diagram illustrating a first example of distribution of image features in the embodiment. FIG. 4B is a diagram illustrating a second example of distribution of image features in the embodiment. The examples in FIG. 4A and FIG. 4B indicate cases in which the image features are feature points. The positions of the image features contained in the image in FIG. 4B are biased to the left in the image. In contrast, the image features contained in the image in FIG. 4A have wider variability and are more widely distributed in the image than the image features contained in FIG. 4B.

The distribution of image features is an important index because, when image features in an image that correspond to image features in other images is more widely distributed in the image, the view of an object varies greatly and the accuracy of estimation of the position and direction of the camera 10 is higher.

For example, the selection unit 12 selects a plurality of correspondence relationships so as to avoid an evaluation value used for evaluating variability in the positions of image features in the image from becoming smaller than an influence threshold when a correspondence relationship with effectiveness lower than an effectiveness threshold is eliminated.

Next, the reliability of a correspondence relationship is calculated by a neural network that uses the correspondence relationship as an input and outputs the reliability of the correspondence relationship. The reliability of a correspondence relationship is a direct index indicating the effectiveness of the correspondence relationship. The reliability of a correspondence relationship is an important index because, when a correspondence relationship leads to the estimation of the position and direction of the camera 10 with higher accuracy, the reliability of the correspondence relationship is higher.

For example, the correspondence relationship acquisition unit 11 further acquires reliability by using a neural network that calculates the reliability of a correspondence relationship. Then, the selection unit selects a plurality of correspondence relationships so as not to eliminate a correspondence relationship with higher reliability of the correspondence relationship.

A correspondence relationship in which the above-mentioned five indexes are greater is effective for calculating the position and direction and three-dimensional information on the surroundings, but only a correspondence relationship in which the indexes are higher or lower cannot be simply selected. This is because the characteristics of correspondence relationships obtained from different scenes are different. For example, in a scene with a larger number of image features, there is no problem to keep an effective correspondence relationship to which any of the above-mentioned five indexes applies and eliminate other correspondence relationships. However, in a scene with a smaller number of image features, it is more important to secure a certain number of correspondence relationships, and therefore it is necessary to keep even a correspondence relationship to which not any of the above-mentioned five indexes apply.

Therefore, the selection unit 12 select correspondence relationships in consideration of an influence on the entirety of a scene (at least one of a plurality of images). In other words, when whether or not a correspondence relationship is effective is determined for selection, an influence on a camera image other than a camera image corresponding to the correspondence relationship involved in the selection is also taken into consideration. Specifically, the selection unit 12 performs the selection in consideration of not only values of the five indexes for evaluating the effective correspondence relationship in the correspondence relationship involved in the selection, but also a value of another index for evaluating an influence on the entirety of the scene.

Note that selecting a correspondence relationship in consideration of correspondence relationships in the entirety of a scene can be performed only with SfM, which is based on off-line processing, and cannot be performed with SLAM, which is based on sequential processing.

Figure 5A:
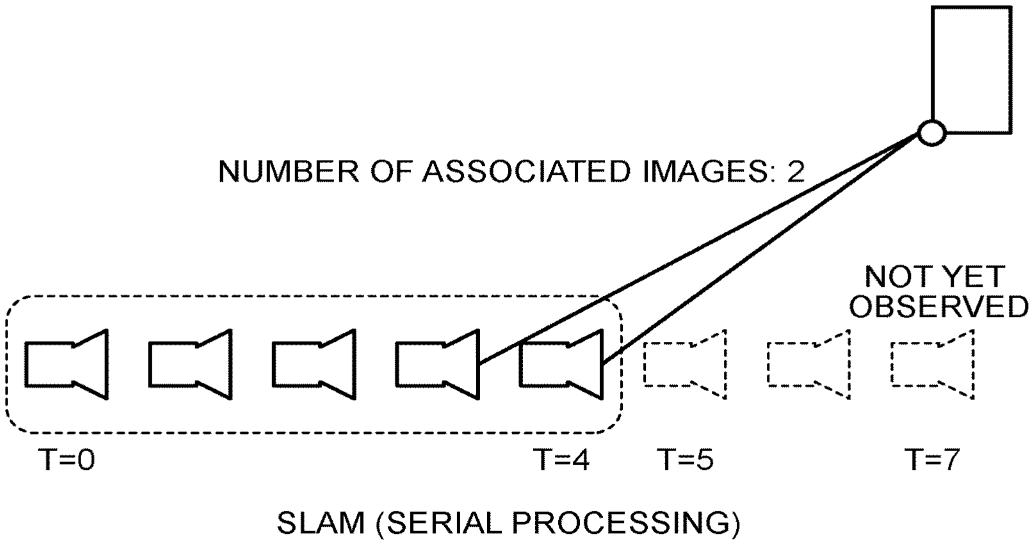
FIG. 5A is a diagram for explaining associating an image feature in SLAM.
Figure 5B:
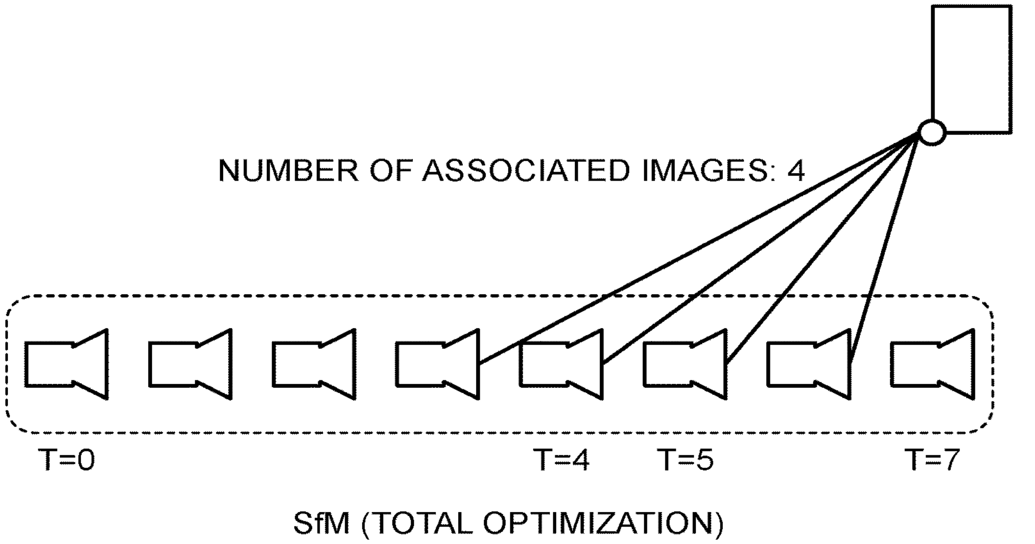
FIG. 5B is a diagram for explaining associating an image feature in SfM.

FIG. 5A is a diagram for explaining associating an image feature in SLAM. FIG. 5B is a diagram for explaining associating an image feature in SfM.

As illustrated in FIG. 5A, in SLAM, image information at future times cannot be known, and therefore, in a correspondence relationship obtained shortly after the image features are detected or associated, the number of corresponding images is small or the amount of movement of features in the images is small. However, there is possibility that, in the images at future times, image features lead to important correspondence for estimating a key point (an important image feature) or the like. Hence, with SLAM, it is difficult to select an image feature in consideration of a value of another index for evaluating an influence on the entirety of a scene.

In contrast, SfM is based on off-line processing, and, as illustrated in FIG. 5B, a correspondence relationship in the entirety of a scene is known in which the computational cost of calculating at least one of the position and direction of the camera 10 and the three-dimensional information of an image feature is optimized in advance. This makes it possible to select an image feature in consideration of a value of another index for evaluating an influence on the entirety of the scene.

As illustrated in FIG. 5A and FIG. 5B, the present embodiment is different from existing algorithms for speeding up or the like in SLAM in that speeding up according to the present embodiment cannot be performed with SLAM, but can be performed with SfM.

To perform selection based on the indexes in consideration of the entirety of a scene, a method of calculating a threshold for each of the indexes for every scene can be employed. For example, a method of determining a threshold (an effectiveness threshold) based on the average or percentile of each of the indexes in all correspondence relationships can be employed. The selection unit 12 selects (keeps without eliminating) a correspondence relationship with effectiveness equal to or lower than the effectiveness threshold, as a correspondence relationship that is effective for calculating the position and direction of a camera and three-dimensional information on a surrounding environment.

To perform the selection, determination processing for considering an influence on the entirety of a scene is performed to maintain the accuracy of calculation of the position and direction of the camera 10 and the three-dimensional information on an image feature (the three-dimensional information on the surrounding environment).

Examples of an influence on at least one of a plurality of images include variability in the positions of image features distributed in each of the images. The selection unit 12 selects a plurality of correspondence relationships so as to avoid an evaluation value for evaluating variability in the positions of image features from becoming smaller than an influence threshold, when a correspondence relationship with effectiveness lower than the effectiveness threshold is eliminated.

Furthermore, for example, as the determination processing for considering the entirety of a scene, processing of determining at least one of the total number of correspondence relationships and the total number of image features in one image by using a predetermined threshold.

Here, the total number of correspondence relationships is equal to the number of sets of image features associated with image features in other images by any of the correspondence relationships (sets of image features indicating the same portion). A set of image features corresponding to one correspondence relationship includes image features indicating the same portion in two or more different images.

When one correspondence relationship is eliminated, a set of image features corresponding to this correspondence relationship is also eliminated. In the case of a correspondence relationship of image features between two images, the number of image features in a set of the image features is two. In the case of a correspondence relationship of image features between n images, the number of image features in a set of the image features is n.

When the total number of correspondence relationships is smaller or when the number of image features in one image is smaller, it is more difficult to maintain the accuracy of calculation of the position and direction of the camera 10 and three-dimensional information on the image features (three-dimensional information on a surrounding environment). Therefore, for example, in accordance with the flowchart in FIG. 6 below, the selection unit 12 according to the embodiment performs processing.

Figure 6:
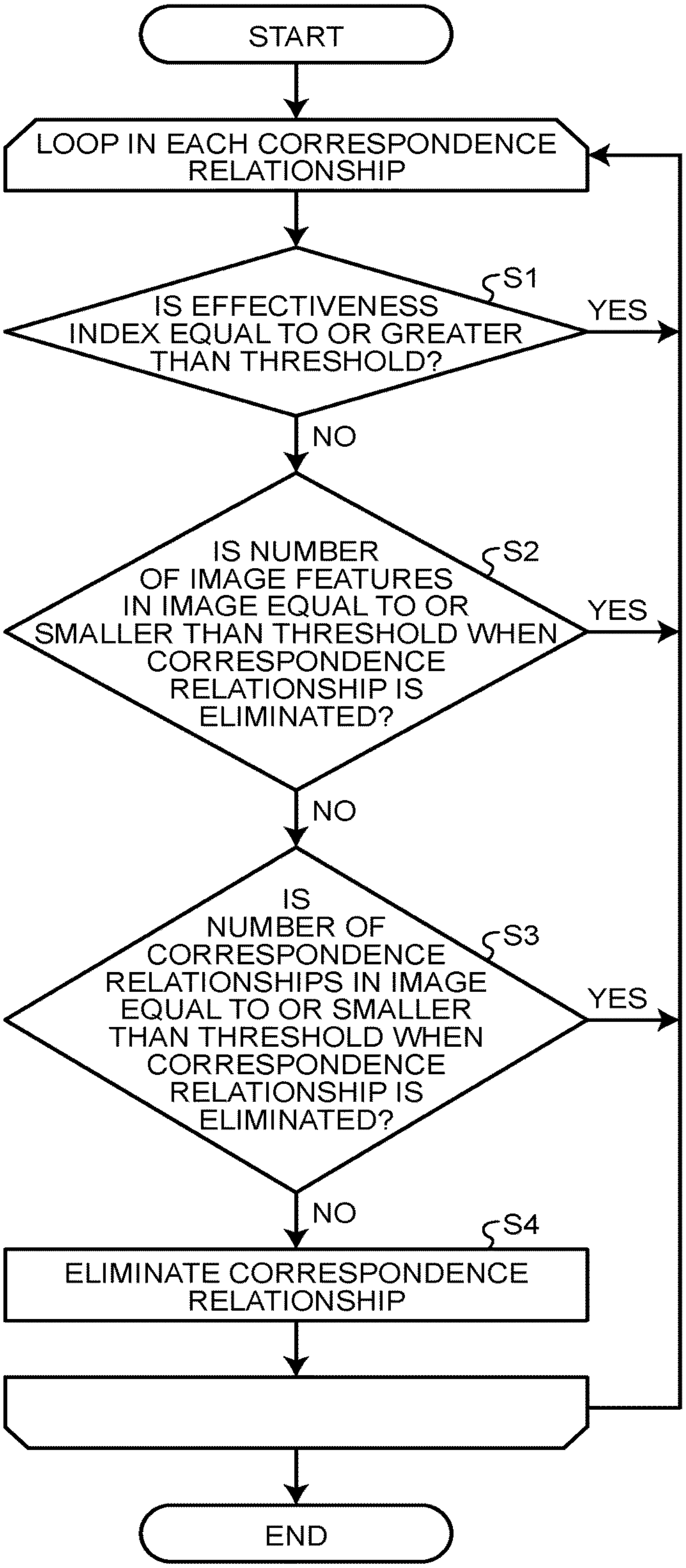
FIG. 6 is a flowchart illustrating an example of processing by a selection unit of the embodiment.

FIG. 6 is a flowchart illustrating an example of the processing by the selection unit 12 according to the embodiment. First, the selection unit 12 selects one correspondence relationship as a processing target and determines whether or not an index for evaluating the effectiveness of the correspondence relationship is equal to or greater than a threshold (an effectiveness threshold) (step S1). For example, as the index for evaluating the effectiveness, at least one of the above-mentioned five indexes for effectiveness evaluation is used.

If the index is equal to or greater than the threshold (Yes at step S1), the selection unit 12 selects a correspondence relationship as a new processing target from correspondence relationships not having undergone the processing and executes the processing of step S1.

If the index is lower than the threshold (No at step S1), the selection unit 12 determines whether or not, in the entirety of a scene (among a plurality of images), an image in which the number of image features is equal to or smaller than a threshold is present when the correspondence relationship as the processing target is eliminated (step S2).

If an image in which the number of image features is equal to or smaller than the threshold is present (Yes at step S2), the selection unit 12 selects a correspondence relationship as a new processing target from the correspondence relationships not having undergone the processing and returns to the processing of step S1. In other words, the selection unit 12 selects a plurality of correspondence relationships so as to avoid the total number of image features in the image from becoming smaller than an influence threshold when the correspondence relationship with effectiveness lower than the effectiveness threshold is eliminated.

If no image in which the number of image features is equal to or smaller than the threshold is present (No at step S2), the selection unit 12 determines whether or not the total number of correspondence relationships is equal to or smaller than a threshold when the correspondence relationship as the processing target is eliminated (step S3).

If the total number of correspondence relationships is equal to or smaller than the threshold (Yes at step S3), the selection unit 12 selects a correspondence relationship as a new processing target from the correspondence relationships not having undergone the processing and returns to the processing of step S1. In other words, the selection unit 12 selects a plurality of correspondence relationships so as to avoid the total number of correspondence relationships in a plurality of images from becoming smaller than an influence threshold when the correspondence relationship with effectiveness lower than the effectiveness threshold is eliminated.

If the total number of correspondence relationships is larger than the threshold (No at step S3), the selection unit 12 eliminates the correspondence relationship as the processing target (step S4), selects a correspondence relationship as a new processing target from the correspondence relationships not having undergone the processing, and returns to the processing of step S1.

When the processing is executed for all the correspondence relationships, the selection processing in accordance with the flowchart in FIG. 6 is completed.

The above is the description about the selection unit 12.

Referring back to FIG. 1, the calculation unit 13 calculates at least one of the position and direction of the camera 10 and three-dimensional information on the image features from the correspondence relationships selected by the selection unit 12. Specifically, first, the calculation unit 13 calculates a basic matrix from information on the selected correspondence relationships and calculates an initial value of the position and direction of the camera 10.

Next, the calculation unit 13 calculates an initial value of the three-dimensional information on the image features (three-dimensional information on a surrounding environment) from the initial value of the position and direction of the camera 10 and the correspondence relationships by triangulation. Finally, the calculation unit 13 reprojects the initial value of the three-dimensional information onto an image, based on the position and direction of the camera 10, and optimizes the position and direction of the camera 10 and the three-dimensional information on the surrounding environment by Bundle Adjustment, which minimizes a reprojection error.

At this time, the calculation unit 13 may optimize the entirety of a scene by a single Bundle Adjustment, or may sequentially increase the number of images to be optimized. For example, a method can be employed for repeating a series of processing while sequentially increasing the number of images to be optimized. Specifically, the calculation unit 13 may partially perform optimization and then calculate an initial value of the position and direction of the camera 10 by solving a Perspective-n-Point (PnP) problem from the optimized three-dimensional information and correspondence relationships. The calculation unit 13 may then increase the three-dimensional information on the surrounding environment by triangulation using the initial value and the correspondence relationships, and then perform optimization again by Bundle Adjustment.

As described above, in the embodiment, the correspondence relationship acquisition unit 11 calculates a plurality of image features from a plurality of images captured by the camera 10 and thereby acquires a correspondence relationship between the image features. The selection unit 12 selects a plurality of the correspondence relationships, based on the effectiveness of the correspondence relationship and an influence on at least one of the images when a correspondence relationship with effectiveness lower than the effectiveness threshold is eliminated. Then, the calculation unit 13 calculates at least one of the position and direction of the camera 10 and the three-dimensional information on the image features from the correspondence relationships selected from the correspondence relationships.

Thus, according to the embodiment, the computational cost of calculating at least one of the position and direction of the camera 10 and the three-dimensional information on the image features can be reduced with accuracy maintained. For example, the optimization processing by the calculation unit 13 can be accelerated by using the correspondence relationships selected by the selection unit 12. Furthermore, since the selection unit 12 selects the correspondence relationships in consideration of an influence on the entirety of a scene (at least one of the images), accuracy in the calculation of at least one of the position and direction of the camera 10 and the three-dimensional information on the image features can be maintained.

First Modification

Next, a first modification of the embodiment will be described. In descriptions of the first modification, the same points as the embodiment will not be described, meanwhile different points from the embodiment will be described. In the first modification, a method of adaptively calculating, through repeated processing, a threshold for an index for evaluating the effectiveness of a correspondence relationship will be described.

In the first modification, first, a lower limit threshold for the total number of correspondence relationships or a lower limit threshold for the number of image features in one image is predefined.

Next, an initial value of a lower limit threshold for at least one of the five indexes for effectiveness evaluation, which have been described in the embodiment, is defined.

Hereinafter, a method for threshold calculation by repeated processing will be described in accordance with the flowchart in FIG. 7.

Figure 7:
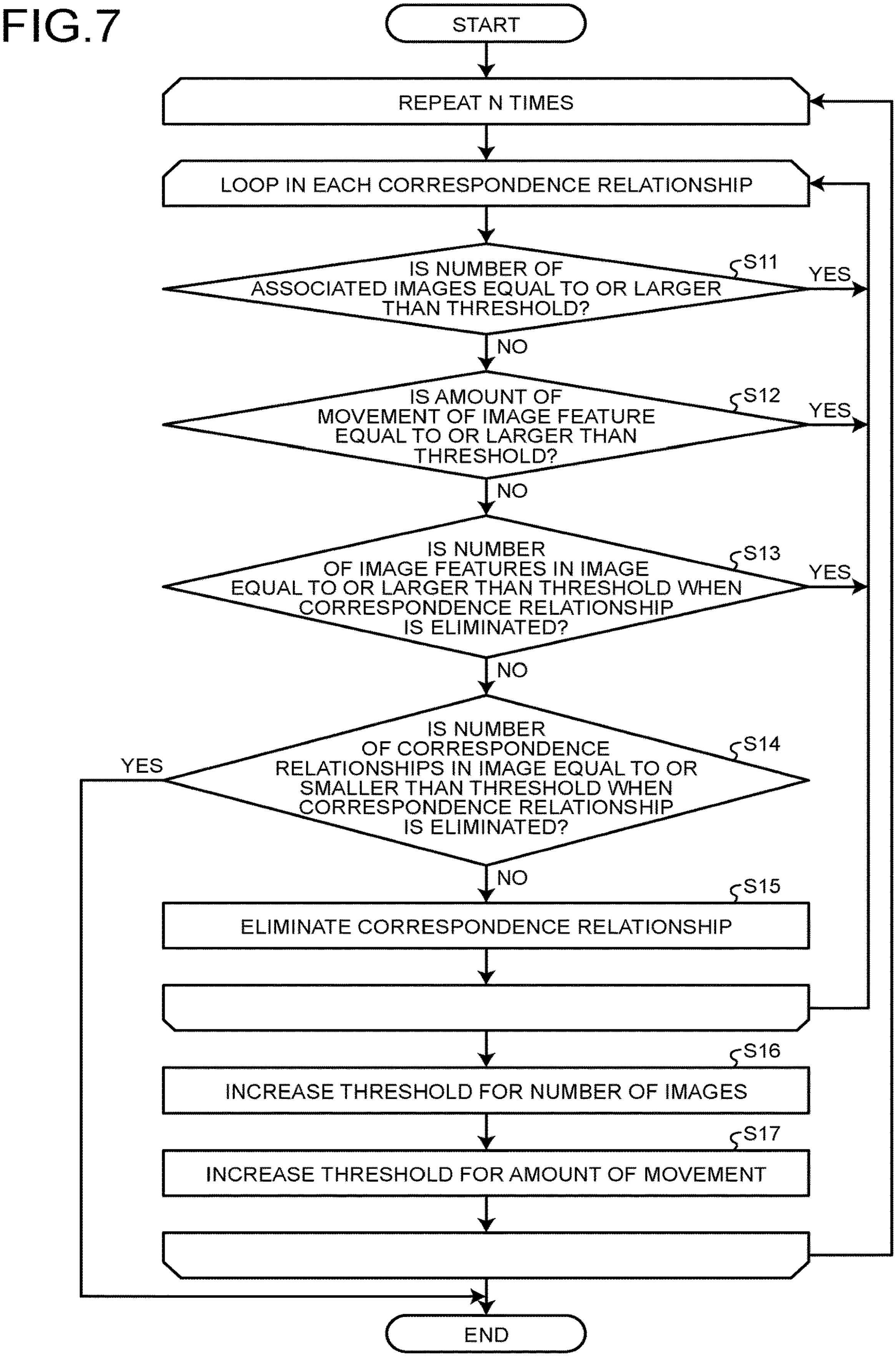
FIG. 7 is a flowchart illustrating an example of processing by a selection unit of a first modification of the embodiment.

FIG. 7 is a flowchart illustrating an example of processing by the selection unit 12 according to the first modification. In the example in FIG. 7, the amount of movement of features in the images and the number of images associated with the correspondence relationship are used as indexes for selecting an effective correspondence relationship, but any combination of one or more indexes for evaluating the effectiveness of a correspondence relationship may be used.

First, the selection unit 12 selects one correspondence relationship as a processing target and determines whether or not the number of images corresponding to the correspondence relationship (the number of images containing image features corresponding to each other) is equal to or larger than a threshold (step S11).

If the number of associated images that corresponds to the correspondence relationship is equal to or larger than the threshold (Yes at step S11), the selection unit 12 selects a correspondence relationship as a new processing target from correspondence relationships not having undergone the processing and executes the processing of step S11.

If the number of images corresponding to the correspondence relationship is smaller than the threshold (No at step S11), the selection unit 12 determines whether or not the amount of movement of the image features in the images, the image features being in the correspondence relationship as the processing target, is equal to or larger than a threshold (step S12).

If the amount of movement of the image features in the images is equal to or larger than the threshold (Yes at step S12), the selection unit 12 selects a correspondence relationship as a new processing target from the correspondence relationships not having undergone the processing and executes the processing of step S11.

In other words, the selection unit 12 determines that the correspondence relationship leading to Yes at step S11 or S12 is effective for calculating at least one of the position and direction of the camera 10 and three-dimensional information on the image features, and stores the correspondence relationship in a memory of the information processing apparatus 1.

If the amount of movement of the image features in the images is smaller than the threshold (No at step S12), the selection unit 12 determines whether or not, when the correspondence relationship as the processing target is eliminated, an image in which the number of image features is equal to or smaller than a threshold is present in the entirety of a scene (among a plurality of images) (step S13).

If an image in which the number of image features is equal to or smaller than the threshold is present (Yes at step S13), the elimination of the correspondence relationship as the processing target leads to a disadvantage in calculating at least one of the position and direction of the camera 10 and three-dimensional information on the image features, and therefore this correspondence relationship is not eliminated. The selection unit 12 selects a correspondence relationship as a new processing target from the correspondence relationships not having undergone the processing and returns to the processing of step S11.

If no image in which the number of image features is equal to or smaller than the threshold is present (No at step S13), the selection unit 12 determines whether or not the total number of correspondence relationships is equal to or smaller than a threshold when the correspondence relationship as the processing target is eliminated (step S14).

If the total number of correspondence relationships is equal to or smaller than the threshold (Yes at step S14), the selection processing is terminated because no more correspondence relationships can be eliminated.

If the total number of correspondence relationships is larger than the threshold (No at step S14), the selection unit 12 eliminates the correspondence relationship as the processing target because an influence on the calculation of at least one of the position and direction of the camera 10 and the three-dimensional information on the image features is minor (step S15). Then, the selection unit 12 selects a correspondence relationship as a new processing target from the correspondence relationships not having undergone the processing and returns to the processing of step S11.

When the processing is executed for all the correspondence relationships, the selection unit 12 increases the threshold for the number of images, which is used at step S11, (step S16), and increases the threshold for the amount of movement, which is used at step S12, (step S17).

By repeating the above-described processing a predetermined number of times (N times), thresholds for the indexes for evaluating the effectiveness of correspondence relationships can be calculated adaptively.

As described above, in the first modification, for example, the selection unit 12 changes an effectiveness threshold (in the example in FIG. 7, the threshold for the number of images and the threshold for the amount of movement) until the total number of image features contained in each of the images approaches a predetermined total number. Then, the selection unit 12 selects a plurality of correspondence relationships so as to avoid the total number of image features contained in each of the images from becoming smaller than an influence threshold when the correspondence relationship with effectiveness lower than the effectiveness threshold is eliminated.

Furthermore, for example, the selection unit 12 changes an effectiveness threshold (in the example in FIG. 7, the threshold for the number of images and the threshold for the amount of movement) until the total number of correspondence relationships approaches a predetermined total number. Then, the selection unit 12 selects a plurality of correspondences so as to avoid the total number of correspondence relationships in a plurality of images from becoming smaller than an influence threshold when a correspondence relationship with effectiveness lower than the effectiveness threshold is eliminated.

Thus, according to the first modification, unnecessary correspondence relationships can be eliminated one by one while the number of features in one image and the total number of correspondence relationships are maintained, where the features are necessary to calculate at least one of the position and direction of the camera 10 and the three-dimensional information on the image features.

Second Modification

Next, a second modification of the embodiment will be described. In descriptions of the second modification, the same points as the embodiment will not be described, meanwhile different points from the embodiment will be described. In the second modification, a case will be described in which an initial value acquisition unit configured to acquire an initial value of the position and direction of the camera 10 is further provided.

Functional Configuration Example

Figure 8:
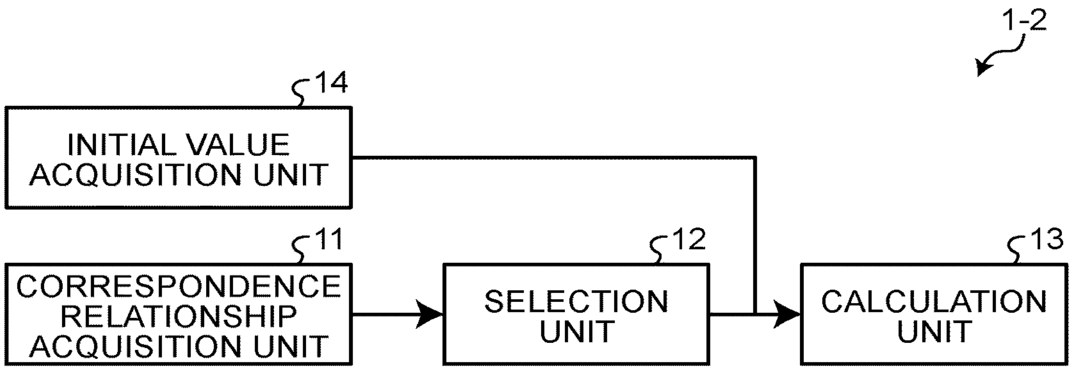
FIG. 8 is a diagram illustrating a functional configuration example of an information processing apparatus of a second modification of the embodiment.

FIG. 8 is a diagram illustrating a functional configuration example of an information processing apparatus 1-2 of the second modification. The information processing apparatus 1-2 of the second modification includes the correspondence relationship acquisition unit 11, the selection unit 12, the calculation unit 13, and an initial value acquisition unit 14. The correspondence relationship acquisition unit 11 and the selection unit 12 are the same as those of the embodiment, and therefore descriptions thereof will be omitted.

The initial value acquisition unit 14 acquires position and direction information including at least one of an initial value of the capturing position of a camera 10 and an initial value of the direction of the camera 10. Specifically, the initial value acquisition unit 14 acquires information on the position and direction of the camera 10, the information being obtained from information other than a correspondence relationship between image features.

For example, the initial value acquisition unit 14 acquires the position and direction information of the camera 10 that is estimated by a neural network using a camera image as an input. Alternatively, for example, the initial value acquisition unit 14 acquires the position and direction information of the camera 10 that is estimated by a global positioning system (GPS). Alternatively, for example, position and direction information obtained from a sensor other than a camera, such as a wheel encoder, may be acquired. Alternatively, for example, the initial value acquisition unit 14 may acquire position and direction information into which, by an average or median value of the above-mentioned sorts of position and direction information, a plurality of pieces of position and direction information is integrated.

The calculation unit 13 calculates at least one of the position and direction of the camera 10 and three-dimensional information on image features from correspondence relationships selected by the selection unit 12 and the initial value included in the position and direction information of the camera 10, the initial value being obtained by the initial value acquisition unit 14. Specifically, first, the calculation unit 13 calculates an initial value of three-dimensional information on a surrounding environment from the initial value of the position and direction of the camera 10 and the correspondence relationship by triangulation. Next, the calculation unit 13 reprojects the initial value of the three-dimensional information onto an image at the position and direction of the camera, and optimizes the position and direction of the camera and the three-dimensional information on the surrounding environment by Bundle Adjustment, which minimizes a reprojection error.

At this time, the calculation unit 13 may optimize the entirety of a scene by a single Bundle Adjustment or may sequentially increase the number of images to be optimized. For example, there a method can be employed for repeating a series of processing while sequentially increasing the number of images to be optimized. Specifically, the calculation unit 13 partially performs the optimization and then adds the position and direction of the camera 10 to be optimized by using the initial value of the position and direction of the camera 10 that is obtained by the initial value acquisition unit 14 or the initial value of the position and direction of the camera 10 that is calculated by solving a PnP problem from the optimized three-dimensional information and correspondence relationship. Furthermore, the calculation unit 13 increases the three-dimensional information on the surrounding environment by triangulation using the initial value and the correspondence relationship. Then, the calculation unit 13 repeats a series of processing including performing optimization again by Bundle Adjustment.

Finally, a hardware configuration example of the information processing apparatus 1 of the embodiment will be described.

Hardware Configuration Example

Figure 9:
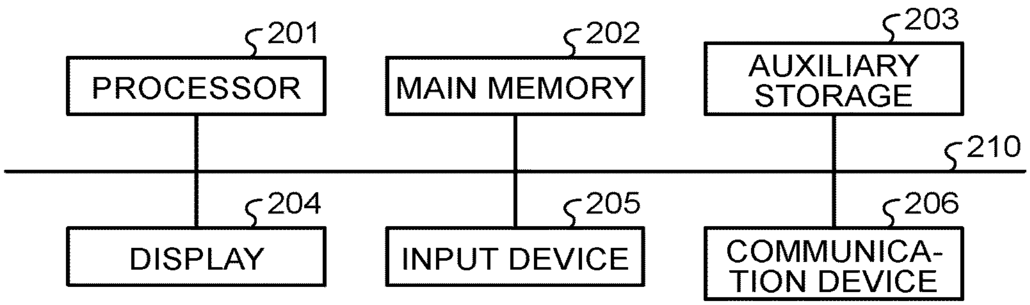
FIG. 9 is a diagram illustrating a hardware configuration example of the information processing apparatus according to the embodiment.

FIG. 9 is a diagram illustrating a hardware configuration example of the information processing apparatus 1 of the embodiment. The information processing apparatus 1 includes a processor 201, a main memory 202, an auxiliary storage 203, a display 204, an input device 205, and a communication device 206. The processor 201, the main memory 202, the auxiliary storage 203, the display 204, the input device 205, and the communication device 206 are connected via a bus 210.

Note that the information processing apparatus 1 may not include some of the above-mentioned constituents. For example, in the case where the information processing apparatus 1 can utilize an input function and a display function of external devices, the information processing apparatus 1 may not include the display 204 and the input device 205.

The processor 201 is configured to execute a program read out from the auxiliary storage 203 to the main memory 202. The main memory 202 is a memory, such as a read only memory (ROM) or a random access memory (RAN). The auxiliary storage 203 is a hard disk drive (HDD), a memory card, or the like.

The display 204 is, for example, a liquid crystal display. The input device 205 is an interface for operating the information processing apparatus 1. Note that the display 204 and the input device 205 may be realized in the form of a touch panel or the like having a display function and an input function. The communication device 206 is an interface for communicating with other devices.

For example, a program to be executed by the information processing apparatus 1 is provided as a computer program product which is a file in an installable or executable format and stored in a computer-readable storage medium such as a memory card, hard disk, CD-RW, CD-ROM, CD-R, DVD-RAM, or DVD-R.

Alternatively, for example, the computer program to be executed by the information processing apparatus 1 may be configured to be stored in a computer connected to a network, such as the Internet, and provided by downloading via a network.

Alternatively, for example, the computer program to be executed by the information processing apparatus 1 may be configured to be provided via a network, such as the Internet, without being downloaded. Specifically, for example, the computer program may be configured by application service provider (ASP) cloud service.

Alternatively, for example, the computer program to be executed by the information processing apparatus 1 may be configured to be provided by being incorporated in advance into ROM or the like.

The computer program to be executed by the information processing apparatus 1 has a module configuration including a function that can be implemented with the computer program among the above-described functional configurations. Each of the functions is configured such that the processor 201 serving as actual hardware reads out the computer program from the storage medium and executes the computer program to load each of the above-mentioned functional blocks into the main memory 202. In other words, each of the above-mentioned functional blocks is created in the main memory 202.

Note that some or all of the above-described functions may be realized not by software, but by hardware such as an integrated circuit (IC).

Alternatively, a plurality of the processors 201 may be used to implement the functions. In this case, each of the processors 201 may implement one of the functions or may implement two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:

one or more hardware processors configured to function as:

a correspondence relationship acquisition unit configured to calculate a plurality of image features from a plurality of images captured by a camera and acquire a correspondence relationship between the image features;

a selection unit configured to:

select, among a plurality of correspondence relationships, a correspondence relationship with effectiveness of the correspondence relationship that is equal to or higher than an effectiveness threshold, and if the effectiveness of the correspondence relationship is lower than the effectiveness threshold, eliminate the correspondence relationship with the effectiveness lower than the effectiveness threshold based on an influence on at least one of the images when the correspondence relationship with the effectiveness lower than the effectiveness threshold is eliminated; and a calculation unit configured to calculate at least one of a position and direction of the camera and three-dimensional information on the image features from the correspondence relationship selected from among the correspondence relationships, wherein at least one of the images includes an image other than an image for which the correspondence relationship with the effectiveness lower than the effectiveness threshold is eliminated.

2. The information processing apparatus according to claim 1, wherein the one or more hardware processors are configured to further function as:

an initial value acquisition unit configured to acquire at least one of an initial value of a capturing position of the camera and an initial value of the direction of the camera, and the calculation unit calculates at least one of the position and direction of the camera and the three-dimensional information on the image features, further based on at least one of the initial value of the capturing position of the camera and the initial value of the direction of the camera.

3. The information processing apparatus according to claim 1, wherein the effectiveness of the correspondence relationship is such that an amount of movement between positions indicated by two image features in the correspondence relationship is greater, the effectiveness threshold indicates a predetermined amount of movement, and the selection unit selects the correspondence relationships so as not to eliminate the correspondence relationship having a greater amount of movement between the positions indicated by the two image features in the correspondence relationship.

4. The information processing apparatus according to claim 1, wherein the effectiveness of the correspondence relationship is such that a number of images containing the image features in the correspondence relationship is greater, the effectiveness threshold indicates a predetermined number of images, and the selection unit selects the correspondence relationships so as not to eliminate the correspondence relationship having a greater number of the images containing the image features in the correspondence relationship.

5. The information processing apparatus according to claim 1, wherein the effectiveness of the correspondence relationship is such that a degree of similarity of the image features in the correspondence relationship is higher, the effectiveness threshold indicates a predetermined degree of similarity, and the selection unit selects the correspondence relationships so as not to eliminate the correspondence relationship having a higher degree of similarity of the image features in the correspondence relationship.

6. The information processing apparatus according to claim 1, wherein, by using a neural network that calculates reliability of the correspondence relationship, the correspondence relationship acquisition unit further acquires the reliability, the effectiveness of the correspondence relationship is such that the reliability is higher, the effectiveness threshold indicates predetermined reliability, and the selection unit selects the correspondence relationships so as not to eliminate the correspondence relationship having higher reliability of the correspondence relationship.

7. The information processing apparatus according to claim 1, wherein the influence on at least one of the images is variability in positions of the image features distributed in each of the images, and the selection unit selects the correspondence relationships so as to avoid an evaluation value used for evaluating the variability in the positions of the image features from becoming smaller than an influence threshold when the correspondence relationship with the effectiveness lower than the effectiveness threshold is eliminated.

8. The information processing apparatus according to claim 1, wherein the influence on at least one of the images is a total number of the correspondence relationships in the images, and the selection unit selects the correspondence relationships so as to avoid the total number of the correspondence relationships in the images from becoming smaller than an influence threshold when the correspondence relationship with the effectiveness lower than the effectiveness threshold is eliminated.

9. The information processing apparatus according to claim 8, wherein the selection unit changes the effectiveness threshold until the total number of the correspondence relationships approaches a predetermined total number, and selects the correspondence relationships so as to avoid the total number of the correspondence relationships in the images from becoming smaller than the influence threshold when the correspondence relationship with the effectiveness lower than the effectiveness threshold is eliminated.

10. The information processing apparatus according to claim 1, wherein the influence on at least one of the images is a total number of the image features contained in each of the images, and the selection unit selects the correspondence relationships so as to avoid the total number of the image features from becoming smaller than an influence threshold when the correspondence relationship with the effectiveness lower than the effectiveness threshold is eliminated.

11. The information processing apparatus according to claim 10, wherein the selection unit changes the effectiveness threshold until the total number of the image features contained in each of the images approaches a predetermined total number, and selects the correspondence relationships so as to avoid the total number of the image features contained in each of the images from becoming smaller than the influence threshold when the correspondence relationship with the effectiveness lower than the effectiveness threshold is eliminated.

12. A computer program product having a non-transitory computer readable medium including programmed instructions stored thereon, wherein the instructions, when executed by a computer, cause the computer to function as:

a correspondence relationship acquisition unit configured to calculate a plurality of image features from a plurality of images captured by a camera and acquire a correspondence relationship between the image features;

a selection unit configured to:

select, among a plurality of correspondence relationships, a correspondence relationship with effectiveness of the correspondence relationship that is equal to or higher than an effectiveness threshold, and if the effectiveness of the correspondence relationship is lower than the effectiveness threshold, eliminate the correspondence relationship with the effectiveness lower than the effectiveness threshold based on an influence on at least one of the images when the correspondence relationship with the effectiveness lower than the effectiveness threshold is eliminated; and a calculation unit configured to calculate at least one of a position and direction of the camera and three-dimensional information on the image features from the correspondence relationship selected from among the correspondence relationships, wherein, at least one of the images includes an image other than an image for which the correspondence relationship with the effectiveness lower than the effectiveness threshold is eliminated.

13. An information processing method implemented by a computer of an information processing apparatus, the method comprising:

calculating a plurality of image features from a plurality of images captured by a camera and acquiring a correspondence relationship between the image features;

selecting, among a plurality of correspondence relationships, a correspondence relationship with effectiveness of the correspondence relationship that is equal to or higher than an effectiveness threshold;

if the effectiveness of the correspondence relationship is lower than the effectiveness threshold, eliminating the correspondence relationship with the effectiveness lower than the effectiveness threshold based on an influence on at least one of the images when the correspondence relationship with the effectiveness lower than the effectiveness threshold is eliminated; and calculating at least one of a position and direction of the camera and three-dimensional information on the image features from the correspondence relationship selected from among the correspondence relationships, wherein at least one of the images includes an image other than an image for which the correspondence relationship with the effectiveness lower than the effectiveness threshold is eliminated.

* * * * *